United States Patent
Samson et al.

(10) Patent No.: US 7,228,287 B1
(45) Date of Patent: Jun. 5, 2007

(54) METHOD OF PROVIDING ONLINE INCENTIVES

(76) Inventors: Ben Simon Samson, 2129 Pine St. #1R, Philadelphia, PA (US) 19103; Jeffrey Paul La Forest, 1815 John F. Kennedy Blvd. #1610, Philadelphia, PA (US) 19106; Robert Preston Hornsby, Jr., 738A Pine St., Philadelphia, PA (US) 19106

( * ) Notice: Subject to any disclaimer, the term of this patent is extended or adjusted under 35 U.S.C. 154(b) by 1134 days.

(21) Appl. No.: 09/711,183

(22) Filed: Nov. 13, 2000

(51) Int. Cl.
*G06Q 30/00* (2006.01)
*G07G 1/14* (2006.01)

(52) U.S. Cl. ....................................................... 705/14
(58) Field of Classification Search ................... 705/14
See application file for complete search history.

(56) References Cited

U.S. PATENT DOCUMENTS

| | | | |
|---|---|---|---|
| 5,687,322 A * | 11/1997 | Deaton et al. | 705/14 |
| 5,822,735 A | 10/1998 | De Lapa et al. | 705/14 |
| 5,822,736 A | 10/1998 | Hartman et al. | 705/1 |
| 5,832,457 A | 11/1998 | O'Brien et al. | 705/14 |
| 5,848,396 A * | 12/1998 | Gerace | 705/10 |
| 5,857,175 A | 1/1999 | Day et al. | 705/14 |
| 5,862,223 A * | 1/1999 | Walker et al. | 705/50 |
| 5,909,023 A | 6/1999 | Ono et al. | 235/380 |
| 5,937,391 A | 8/1999 | Ikeda et al. | 705/14 |
| 5,948,061 A | 9/1999 | Merriman et al. | 709/219 |
| 5,970,469 A | 10/1999 | Scroggie et al. | 705/14 |

(Continued)

FOREIGN PATENT DOCUMENTS

JP  2001350789 A  * 12/2001

OTHER PUBLICATIONS

Y. Bakos, "The Emerging Role of Electronic Marketplaces on the Internet", Communications of the ACM, Aug. 1998, (last retrieved on May 3, 2002), <http://www.stern.nyu.edu/~bakos>.

(Continued)

*Primary Examiner*—Arthur Duran

(57) ABSTRACT

A method of providing incentives to bidders on an auction item using a database and a system, the method including creating the consumer profile for at least one consumer, choosing at least one of the unsold items from the inventory based on the consumer information in the consumer profile, generating the incentive for the chosen unsold item based on the consumer file, the selection of consumer information of the incentive being substantially similar to the consumer information in the consumer profile, and offering the chosen unsold item and the incentive to the at least one consumer to induce purchasing of the chosen unsold item. The database has an inventory file having at least one of detailed descriptions of an inventory, a list of similar items of the inventory, and a list of complementary items of the inventory, and a consumer profile having at least one of bidding history, start bid, bid frequency, bid increment, final bid, winning bid, target product, Internet service provider, zip code, credit card type, and coupon redemption rate. The system has a first memory for storing consumer profiles having consumer information, including at least information relating to bids on the auction items, a second memory for storing unsold items in an inventory, and a third memory for storing a plurality of incentives for each unsold item, each incentive having a value based on a selection of the consumer information.

20 Claims, 4 Drawing Sheets

U.S. PATENT DOCUMENTS

| | | | |
|---|---|---|---|
| 5,974,399 A | 10/1999 | Giuliani et al. | 705/14 |
| 6,009,412 A | 12/1999 | Storey | 705/14 |
| 6,014,634 A | 1/2000 | Scroggie et al. | 705/14 |
| 6,018,718 A | 1/2000 | Walker et al. | 705/14 |
| 6,026,368 A | 2/2000 | Brown et al. | 705/14 |
| 6,026,370 A | 2/2000 | Jermyn | 705/14 |
| 6,041,308 A | 3/2000 | Walker et al. | 705/14 |
| 6,049,778 A | 4/2000 | Walker et al. | 705/14 |
| 6,477,509 B1 * | 11/2002 | Hammons et al. | 705/27 |
| 2001/0034696 A1 | 10/2001 | McIntyre | |
| 2001/0047308 A1 | 11/2001 | Kaminsky et al. | |
| 2002/0002529 A1 | 1/2002 | Tokiwa et al. | |

OTHER PUBLICATIONS

A. Engelfriet, "E-commerce Business Models", Ius Mentis, Dec. 7, 2001, (last retrieved on Sep. 9, 2002), http://www.iusmentis.com/business/ecommerce/businessmodels>.

* cited by examiner

METHOD OF PROVIDING ONLINE INCENTIVES

FIELD OF INVENTION

The present invention relates to consumer incentive systems, and in particular, relates to online incentives for auction bidders.

BACKGROUND OF INVENTION

One method of selling merchandise may be through online auctions. Consumers and retailers may sell merchandise over the Internet where winners may be determined by method of the auction, bid price, bid quantity and bid date. While many consumers may bid on goods at a web site, those bidders willing to purchase merchandise, but having unsuccessful bids, may not purchase any merchandise. It is believed that this causes a loss of potential revenue for sellers having additional inventory available for sale at a price at or below the consumer's reservation price.

It is believed that online dynamic pricing tools are increasingly being used to help move slow-moving or excess inventory faster and at a more attractive price than was possible before the advent of the Internet. Applicants believe that today's online auctions and buying groups, however, do not always create an optimal selling environment. In the perfect world of pricing theory, where buyers and sellers have an infinite amount of time to wait, where product value does not decay over time, and where there are no explicit inventory holding costs, Applicants believe that auctions may be the best inventory disposition option for the seller. In the real world of retail merchandising, however, Applicants believe that these perfect conditions crumble, demanding a more creative approach to selling than simple auctions.

Applicants believe that retailers currently have three principal options for dealing with excess inventory. First, they may accumulate bulk quantities to be sold to liquidators (often for pennies on the dollar) at the end of the product's life cycle. Second, they may advertise a product clearance sale to the general population. Third, they may accumulate bulk quantities and ship the merchandise back to the manufacturer for credit. It is believed that all of these methods reduce the value that retailers are able to capture from these sales. Bulk sales to liquidators, as with any transaction involving a middleman, may result in a transfer of economic value from retailers to liquidators. General price reductions through clearance-style sales may transfer too much economic value from retailers to consumers, as many consumers who may have bought merchandise at a price higher than the promotion sale price in the absence of a sale may instead divert to slow-moving inventory at a lower price point.

Applicants believe that to help solve the problem of lost revenue at auctions and reduce the cost of holding excess inventory, there are many different incentive and award programs to influence consumers to purchase on-line. For example, it is believed that one incentive program allows users to earn points, which are redeemable for products, by reading e-mail offers, shopping, completing surveys, accepting trial offers, referring other users, and reviewing web sites. It is believed that another incentive program allocates monetary amounts available for expenditure through credit instruments issued to program participants when the participants perform to a designated level of achievement. Applicants believe that these systems are generally offered by a single sponsor and are generally limited to offering consumers the ability to participate in incentive programs. It is also believed that the systems are typically not applicable for activity on auction sites.

SUMMARY OF THE INVENTION

The present invention provides a method of providing incentives to bidders on an auction item, including creating a consumer profile for at least one consumer, the consumer profile including at least information relating to a bid on the auction item, choosing at least one unsold item from an inventory based on the information in the consumer profile, generating an incentive for the at least one chosen unsold item based on the consumer profile, and offering the at least one chosen unsold item and the incentive to the at least one consumer to induce purchasing of the chosen unsold item.

The present invention also provides a system for implementing an incentive program for bidders on auction items, including a consumer database storing consumer information, software for choosing unsold items from an inventory and generating incentives for the chosen unsold items based on the consumer information in the consumer database, and software for offering the chosen unsold items and the incentives to consumers to induce purchasing of the chosen unsold items. The consumer information has, at the least, information relating to bids on the auction items.

The present invention also provides a system for an incentive program for bidders on auction items, including a first memory for storing consumer profiles having consumer information, having at least information relating to bids on the auction items, a second memory for storing unsold items in an inventory, and a third memory for storing a plurality of incentives for each unsold item, each incentive having a value based on a selection of the consumer information.

The present invention also provides a method of providing incentives to bidders on an auction item using a system having a first memory for storing consumer profiles that have consumer information including at least information relating to bids on the auction items, a second memory for storing unsold items in an inventory, and a third memory for storing a plurality of incentives for each unsold item, wherein each incentive has a value based on a selection of the consumer information. The method includes creating the consumer profile for at least one consumer, choosing at least one of the unsold items from the inventory based on the consumer information in the consumer profile, generating the incentive for the chosen unsold item based on the consumer profile, the selection of consumer information of the incentive being substantially similar to the consumer information in the consumer profile, and offering the chosen unsold item and the incentive to the at least one consumer to induce purchasing of the chosen unsold item.

The present invention further provides a database for an incentive program for bidders on auction items, including an inventory file having at least one of detailed descriptions of an inventory, a list of similar items of the inventory, and a list of complementary items of the inventory, and a consumer profile having at least one of bidding history, start bid, bid frequency, bid increment, final bid, winning bid, target product, Internet service provider, zip code, credit card type, and coupon redemption rate.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention.

FIG. 1 is a block diagram of the method of the preferred embodiment

DETAILED DESCRIPTION OF THE PREFERRED EMBODIMENT

Figure 1:
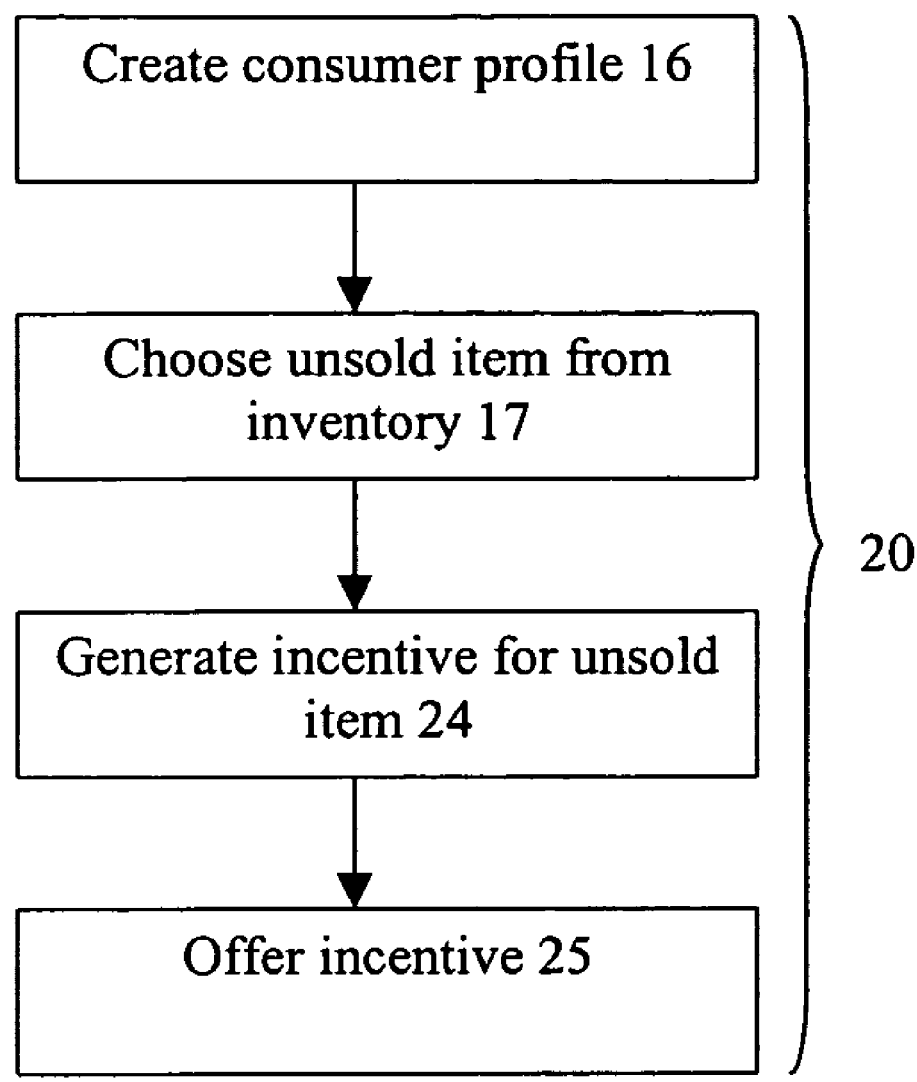

As shown in FIG. 1, the method, or incentive system 20, includes creating a consumer profile 16 for at least one consumer, choosing at least one unsold item, or product to offer, 17 from an inventory based on the information in the consumer profile, generating, or calculating, an incentive for the chosen unsold item 24 based on the consumer profile, and offering the chosen unsold item and the incentive to the consumer 25 to induce purchasing of the chosen unsold item. The consumer profile includes at least information relating to a bid on the auction item.

Figure 2:
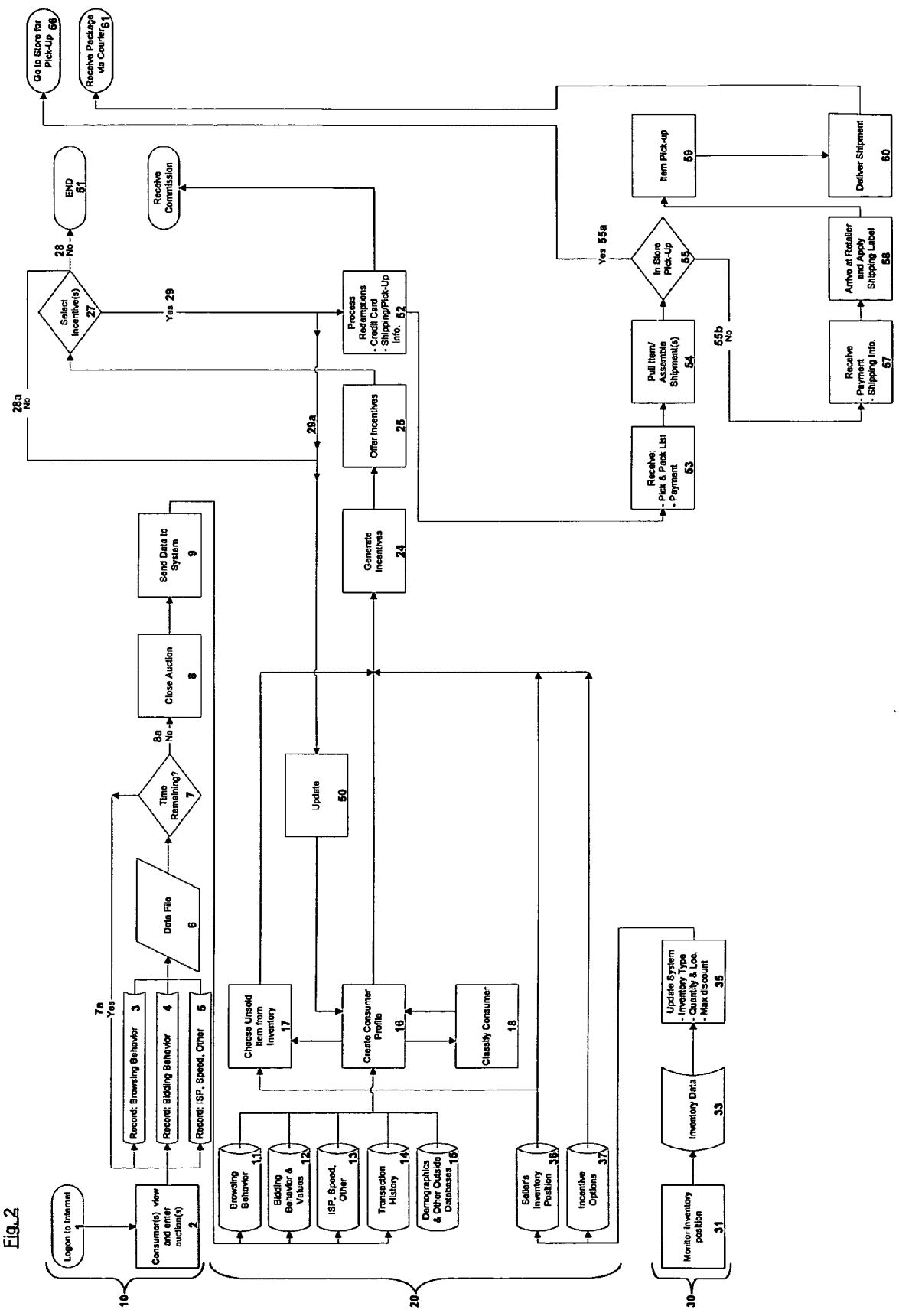
FIG. 2 is a block diagram of the preferred embodiment of the method of FIG. 1 incorporated into an overall product sales system.

In the preferred embodiment, as shown in FIG. 2, the incentive system 20 is incorporated to an overall product sales system with a data provider system 10 and a product supplier system 30. In the preferred embodiment, the data provider system 10 is an auction house and the product supplier 30 is a retailer and/or manufacturer. It should be understood that the data provider system 10 may be any system that supplies information about consumers, such as retailers, distributors, and manufacturers, and the product supplier system 30 may be any system that supplies goods or services, such as financial services and real estate brokers.

In the preferred embodiment, the consumer logs onto the Internet 1 and chooses an auction site that is entered and viewed 2. It should be understood that the device for connection to the Internet 1 could be a personal computer implementing a web browser with a graphics user interface (GUI). However, other connection devices, such as telephones with a display to communicate information with or without graphics, personal display devices, or any other device that allows communication links to and from the Internet, may be used. Moreover, although Internet communication protocol, such as TCP/IP protocol is a preferred communication method for the preferred embodiment, other similar methods may be employed. In addition, in particular applications of the preferred embodiment, the process of viewing may be conducted via a connection, such as a dial-up or direct connection link. For example, secured connections may be used to provide incentives on financial instruments or other secured items.

In the preferred embodiment, the consumer bids on items through the Internet. In an alternative embodiment, the consumer attends an auction house, in person, and bids on auction items, using a method required by the auction house. This method may include raising a bidding card with a number assigned to the consumer. In the preferred embodiment, as the consumer explores the site and places bids on auction items, the auction house records the consumer's browsing behavior 3, bidding behavior 4, and other data 5. The browsing behavior 3 may include the auction items the consumer has considered and the bidding behavior 4 may include start bids and bid frequency. The other data 5 may include information about the consumer's personal computer, such as Internet service provider and modem speed. The recorded information is stored in a data file 6 by the auction house. The auction house continuously monitors all bidders and records their behavior, while the auction is still open or there is still time remaining 7, specified by yes 7*a*. When there is no time remaining 7, specified by no 8*a*, the auction is closed 8 and the data file 6 is then sent 9 to the incentive system 20.

This incentive system 20 may use existing auction infrastructures to capture and analyze relevant data in the data file 6. The system 20 enables retailers and manufacturers to minimize cash flow constraints, brand dilution concerns, inventory levels, fragmentation of the online dynamic pricing market, and impatient bidder populations, which all conspire to create conditions that reduce the viability of simple dynamic pricing formulas.

The sent data received by the incentive system 20, preferably, has price-sensitivity indicators for all bidders, including browsing behavior 11, bidding and behavior values 12, personal computer information 13, such as an Internet service provider and modem speed, and transaction history 14. Preferably, the browsing behavior 11 has click stream information, which includes other components of the auction site that were visited by the consumer, number of pages visited, time spent on each page during each visit per each auction, number of auctions visited/participated, and frequency of revisiting auctions. Preferably, the bidding and behavior values 12 includes bidding history, start bid, bid frequency, bid increment, final bid, winning bid, target product, coupon redemption rate, and keywords used in auction searches. The personal computer information 13 includes Internet service provider, referring URL link, web browser make and model, operating system, bookmarks, zip code, access location (work or home), and credit card type. Preferably, the bidding and behavior values 12 also contain whether the consumer's bid was a successful bid, which is the winning bid, or an unsuccessful bid. Demographics, psychographics, market conditions, and any other relevant information from other databases 15 or any other relevant information identified through contact with the consumer may also be recorded. From this information 11, 12, 13, 14 and 15, the system 20 creates a consumer profile 16.

Figure 3:
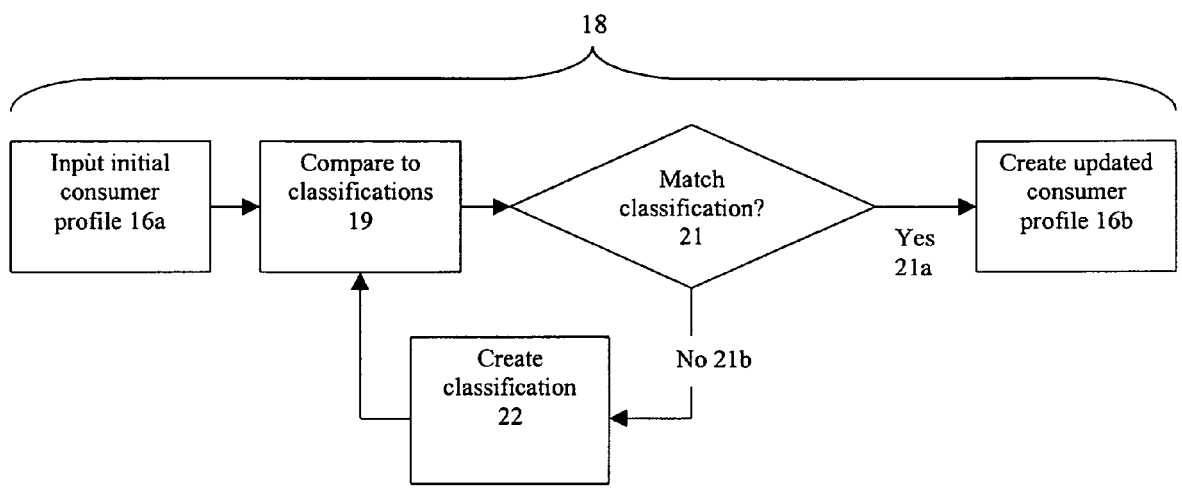
FIG. 3 is a block diagram of the classify consumer step of the method of FIG. 2.

The information in the consumer profile is used and updated throughout the system 20. One such use is in classifying, or categorizing, the consumer into a consumer category 18. As shown in FIG. 3, an initial, or current, consumer profile, which contains the information 11, 12, 13, 14, and 15 that is unique to the consumer, is inputted 16*a*. In creating an updated consumer profile 16*b*, which includes a classification, the initial consumer profile is compared with existing consumer classifications 19, or index of consumer behavior indicators, in a database of the system 20. There are several different classifications, which may be modified or divided into more classifications, as required by the system. In the preferred embodiment, classification categories include at least:

Price Sensitive/Insensitive

Based on recorded behavior, a consumer may be classified as either being price sensitive or insensitive. For example; a consumer who has been found to be bidding in three auctions, but consistently stops bidding once the price for the item reaches some set level is in the price sensitive category.

Brand Sensitive/Insensitive

Based on recorded behavior, a consumer may be classified as either being brand sensitive or insensitive. For example, a consumer who is bidding on a given item from brand X and has also looked at/bid on brands Y, Z, A, B, and C may be labeled as brand insensitive.

Time Sensitive/Insensitive

Based on recorded behavior, a consumer may be classified as either being time sensitive or insensitive. For example, a consumer who enters a nine day auction on the ninth day with 3 hours remaining to make his/her first bid may be labeled as time sensitive.

Feature Sensitive/Insensitive

Based on recorded behavior, a consumer may be classified as either being feature sensitive or insensitive. For example, a consumer views/bids only items with feature X would be considered feature sensitive.

Intersection(s) of Above Listed Classifications

Classifications may also be combined to form new classifications, which may be improved groupings. For example, if the price sensitive and brand insensitive categories intersect, then the resulting classification is a consumer that views/bids on items that focus on/around a given price point, but are from numerous different brands.

The comparison determines if there is a match 21 between the consumer profile and a classification in the database. If there is a match between the consumer profile and a classification, specified by yes 21a, between the consumer profile and the classification, then the consumer profile 16b is categorized in that classification. If there is not a match between the consumer profile and the classification, specified by no 21b, then a new classification will be created 22 and the database will be updated with the new classification. The consumer profile 16a will again be compared 19 to the classifications in the database and a match will be found, specified by yes 21a, because the consumer profile 16a will match the classification created with the consumer profile. As the classification is stored in the consumer profile, any personal information unique to the consumer, such as names and credit card numbers, will be deleted. The consumer profile 16 will then have the consumer information from 16a, less any personal information, and the classification from 16b.

The system 20 also includes choosing at least one unsold item from an inventory 17. In order to choose the unsold items from inventory 17, inventory positions of retailers and/or manufacturers are monitored 31. This entails collecting inventory data from the retailers and/or manufacturers 33. The inventory data 33 may include detailed descriptions, such as inventory type, inventory levels, quantity and physical and virtual location of inventory, lists of similar items, and lists of complementary items. An inventory database system 35 is created and updated from the inventory data 33 of both the retailers and manufacturers. A maximum allowable discount from the full price for each unsold item in the inventory, or minimum price, is also determined and stored in the inventory database system 35. The maximum allowable discount may be negotiated and is based on the seller's, or retailer's or manufacturer's, inventory pressure, which is a measure of the desire to more quickly move the inventory out of their stores and to another retailer or distributor or a consumer. Pressure is driven by the explicit and opportunity costs of holding onto the inventory, as well as space and any other constraints.

Preferably, the system 20 uses the inventory database system 35 to enable retailers struggling with the issue of excess inventory to effectively and profitably move excess inventory at prices that meet their margin objectives and on a schedule that meets their cash flow objectives. Preferably, the inventory database system 35 are received by the system 20, where seller's inventory positions 36 containing the inventory data 33, and incentive options 37 are determined. The seller's inventory positions 36, preferably, contain products in their slow-moving or excess inventory and dead inventory and returned items to enable the sellers to effectively and profitably move excess inventory at prices that meet their margin objectives, and on a schedule that meets their cash flow objectives. The sellers' forecasting and point-of-sale inventory control systems may also be considered. The incentive options 37 include additional percentage or specified amount discounts from manufacturers to help the seller or retailer move the inventory, such as where the retailer gives an additional 5% incentive on all Model 1234 goods or services moved out of inventory, and free add-ons, such as more warranty or free or otherwise discounted additional goods or services.

Based on the product attributes the consumer most prefers, which are revealed in the browsing behavior 11 in the consumer profile, and the seller's inventory position 36, an attribute based product consideration set, which enables the system 20 to choose unsold items from inventory 17, is created. For example, if the consumer is considered brand-driven, where the consumer looks for products across the price spectrum, but only focuses on a given manufacturer, the products in the product consideration set will most likely be products by that given manufacturer. The products offered will be determined by the seller's inventory position 36 because only certain products will be available to offer from the seller's inventory. Similarly, if the consumer is considered price-sensitive, where the consumer looked for products within a certain price range, then only products within that price range may be included in the product consideration set.

When the consumer profile is classified 18, the unsold item from inventory is chosen 17, and the seller's inventory position 36 and incentive options 37 are determined, the system 20 will generate incentives 24 using a learning model. The learning model calculates the incentives based on the information in the consumer profile, classification, product consideration set, seller's inventory position 36, and incentive options 37. Preferably, the calculations performed by the learning model will maximize the seller surplus 43. The learning model is constantly monitored and updated to improve accuracy. When the system 20 is turned on at Day 0, it has minimal information on which to base incentive generation decisions. As time goes by and redemption data is accumulated, statistics will be used in the learning model to determine what information, or attributes, add to the ability to accurately produce incentives and which attributes do not add value. Once this is known, attribute weights will be adjusted to reflect this information. Over time, it is possible to more accurately understand how important each attribute is in computing the proper incentive. In the preferred embodiment, the redemption rate is among the primary indicators monitored and updated in order to improve the accuracy of the attributes, of the data, and their weightings in the learning model. Each profile/incentive combination may be regularly monitored for accuracy by reviewing redemption statistics. For example, Consumer Profile #A3421 may suggest a given amount of incentive. If this incentive is given to the consumer whose behavior matches the profile and the consumer chooses the incentive, then the score for the profile/incentive combination will improve. Consumer profiles exhibiting low or split accuracies will either be recomputed (if low) or split into further profiles (if split) to improve their accuracy.

In regard to the information in the consumer profile, preferably, each piece of data is assigned a weight, which determines the amount of influence, or importance, each piece of data will have in the calculation of the incentive. Preferred attributes include intensity (how often the consumer bid, checked on the current bid price, viewed the website in general), competitiveness (if the consumer responded each and every time he or she was outbid), final bid-price (as a percentage or full-retail price of an item, where the higher the final bid, the less of an incentive a consumer will receive), and zip code driven demographics (higher level annual income zip-codes will receive less of a discount than lower annual income zip codes). In one embodiment, the number of bids may be used by the learning model, where if consumer 1 (C1) bid 5 times during the auction and consumer 2 (C2) bid 10 times during the auction, it may be determined that C2 is more interested in the auction item than C1. As a result, C1's incentive will be less than C2's incentive because C2 is more interested and will be willing to pay more for a given item. In another embodiment, the referring URL link may be used by the learning model, where C1 enters the auction from a pricing/search bot, which is a class of Internet search agents employed by consumers to scour the various retailers and auctions databases to look for an item with the criteria the consumer specifies, such as price, make, model, etc., and C2 enters from some generic link (start page of C2's Internet Service Provider). C1 will receive incentives greater than C2 because entering through a price-bot indicates that C1 is price sensitive. In yet another embodiment, the learning model may use current and past bid data and number of auctions visited and/or participated, where C1 participated in three auctions from the start point of each auction, but consistently dropped out when the price of the auction item reached X % of full retail or some actual dollar amount and C2 participated in only one auction and joined with a few hours remaining. C1 may be viewed as more price sensitive than C2 because C1 has a clear price ceiling, so C1 will receive an incentive greater than C2.

In regard to the classifications, consumers determined to be price sensitive may receive incentives with larger values than those determined to be price insensitive, consumer's determined to be brand sensitive may receive incentives targeted only for specific brands they are determined to be interested in while consumers determined to be brand insensitive may receive incentives for any number of brands available, and consumer's determined to be time sensitive may receive incentives with lower values than those consumers determined to be time insensitive. Additionally, consumers determined to be feature sensitive may only receive incentives for items containing the feature of interest, or in the case where items containing the feature of interest are not available, the incentive for an alternate item will be greater than if an item with the feature was available.

The learning model will also determine the products that meet the criteria of both the product consideration set and the seller's inventory position 36. The learning model calculates incentives for products determined to be part of an individual consumer's product consideration set. The product consideration set may be constrained in two ways. First, the set may be constrained by the available inventory from the seller's or retailer's shelves. Second, the set may be chosen based on the behavior of the individual consumers. The products offered may be comparable or different items in relation to the original auction item, and all of the products from the consideration set may be offered or a select few may be offered. The products may also be from one or more sellers. For example, if consumer 1 (C1) had been viewing goods A, B, C, D, and E, all from different manufacturers, but with retail prices falling between $300–$325, then C1 would be offered (based on availability) goods from any manufacturers with similar average prices. In contrast, if consumer 2 (C2) had been viewing goods V, W, X, Y, and Z, all from manufacturer J, but varying in price from $200–$500, C2 would be offered (based on availability) goods from manufacturer J that varied in price. Preferably, each of these goods will have a discount zone 38, where the effective price 41 will be determined based on the consumer profile and matched classification.

Figure 4:
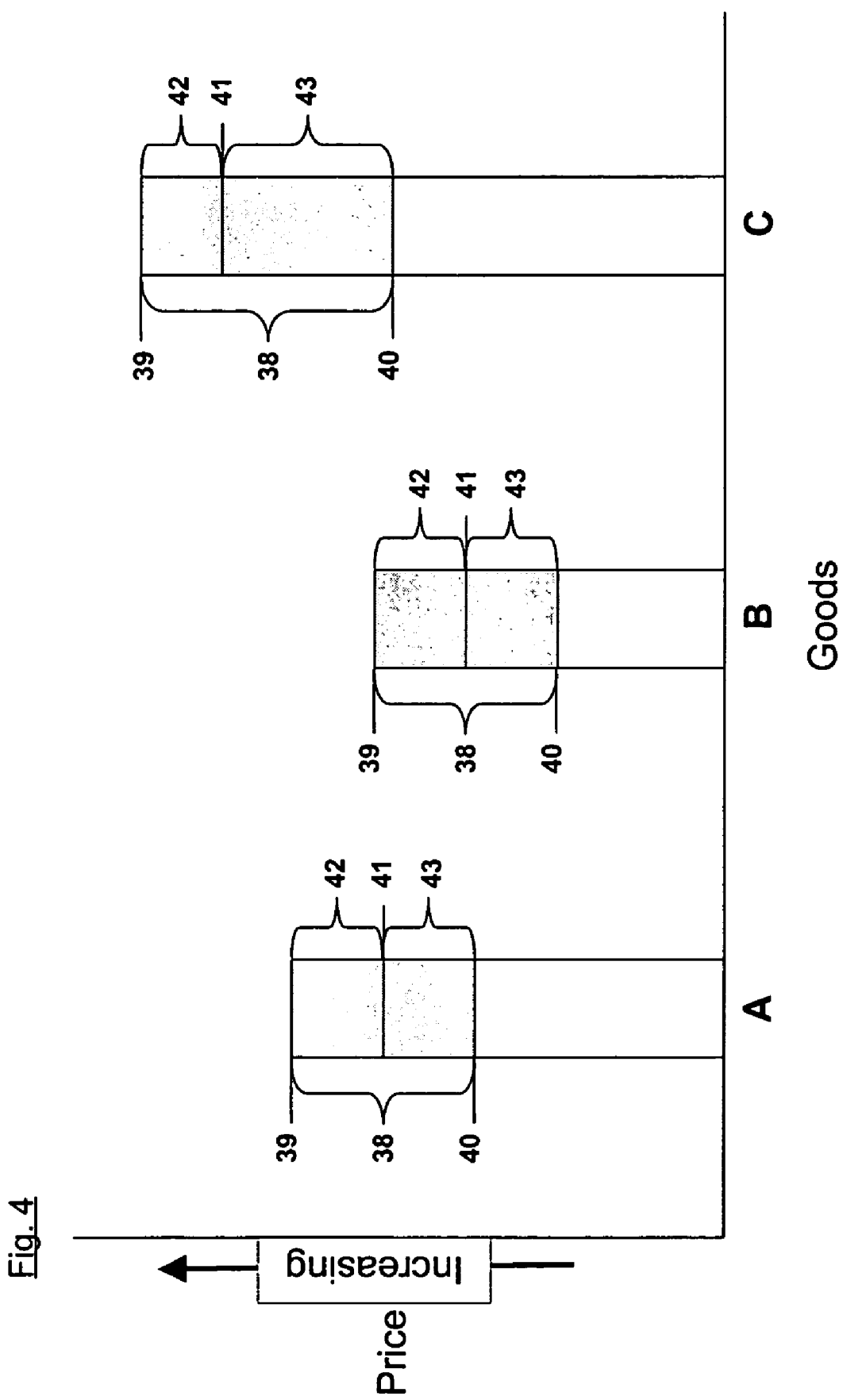
FIG. 4 is a bar graph of incentive options of the method of FIG. 2.

FIG. 4 displays a bar graph of the incentives that may be calculated for Goods A, B and C. The incentives are calculated by first establishing a discount zone 38 between a full price 39 of the unsold item and the minimum price 40, which is the full price 39 less the maximum allowable discount. More specifically, an effective price 41 within the discount zone 38 deemed necessary to trigger a consumer purchase is calculated and offered to the consumer as the incentive. The effective price 41 will vary within the discount zone and a larger discount zone 38 will result in a greater variance. For example, the discount zone 38 of Good C is greater than the discount zone 38 of Goods A and B, so there is more variance in the effective price 41 for Good C than Goods A and B. The discount zone 38 may be divided into a consumer surplus 42 between the full price 39 and the effective price 41 and a seller surplus 43 between the effective price 41 and the full price 39 less the maximum allowable discount 38. An effective price 41 that is closer to the full price than the minimum price 40, as shown for Good C, will result in a greater seller surplus 43. The effective price 41 will be the incentive offered to the consumer.

When an incentive is generated 24, or created, the system 20 will then offer the incentive 25 to the consumer. In the preferred embodiment, an incentive notification is created and sent to the consumer. The incentive notification may be in the form of e-mail or any other type of delivery. The incentive may be a general incentive for any product or a specific incentive for a specific product. In addition, the notification may contain one or more incentives offered at the same time to the same consumer. These incentives may be based on a retail price of the auction item or an unsuccessful bid, which is less than a lowest successful bid in the auction. The incentives may also be in the form of a coupon, discount, rebate, additional product, reward, or any other type of offer. For example, an e-mail entitled "Manager's Special" may be sent to C1, a consumer, with notification that C1 was outbid on a S brand product. The e-mail may or may not give C1 a time limit to respond to the offers, or incentives. There may be several incentives for C1 to choose, such as a coupon for $91 off a J brand product A with a MSRP (manufacturer's suggested retail price) of $299.95 from Stereo Store, a coupon for $71 off a P brand product A with a MSRP of $349.99 from Electronic Retailer, a coupon for $46 off a S brand product A with a MSRP of $299.99 from Ed's Manufacturer, and a coupon for a S brand product B with a MSRP of $249.99 from Stereo Store. The J brand, P brand, and S brand products A are comparable items to the S brand product A in which C1 was outbid, whereas the S brand product B is a different item, but is the same brand as the auction item. In addition, the products are from three different sellers, with two products from the same seller. The incentives are also all based on the retail price of the product.

When the incentive is delivered to the consumer, the consumer has the option of selecting the incentive 27. If the consumer chooses not to select the incentive, specified by no 28, the system 20 will update 50 the consumer profile with information that the incentive was not redeemed. The consumer may specify no 28 by not responding to the incentive within a specified period of time, terminating communications, or responding with a rejection. When no 28 is specified, the contact with the consumer will end 51.

If, however, the consumer chooses to select the incentive, specified by yes 29, the consumer profile will be updated 50 with information that the incentive was redeemed and the redemption will be processed 52. The redemption information is then used to determine how accurate the learning model is performing. For example, if approximately 50% of the consumers in a classification expected to act on an incentive do not, the learning model may then split the classification into two other and/or new classifications. The data elements that are familiar to those choosing the incentive will form a first split classification and the data elements that are familiar to those not choosing the incentive will form a second split classification. If, on the other hand, the redemption rate is statistically very low, the learning model may recompute, or modify, the classification altogether.

To accept the incentive, preferably, the consumer may click on a hypertext link, which may be in the form of an image, and proceed with purchasing the product. This allows for automated fulfillment of rewards. Processing 52 includes collecting payment information, such as a credit card number, and shipping or pick-up information. The consumer or retailer may choose to arrange shipment of the product if the store is not located near the consumer or the consumer may choose to pick up the product at a local retailer. At this point, a commission for providing the incentive generated by the system 20 will be received by the operator of the system 20. Preferably, the commission is a transaction fee or a percentage of the seller surplus 42 on the product offered with the incentive.

When the payment information is collected from the consumer, it is forwarded in the form of a pick and pack list and received 53, along with payment, by the seller. The seller will pull the item and/or assemble shipment 54. If the consumer specified an in store pick-up 55, specified by yes 55a during processing 52, then the seller will hold onto the offered product until the consumer goes to the store for pick-up 56. On the other hand, if the consumer did not want in store pick-up 55, specified by no 55b, then a carrier will receive payment for shipping and the shipping information 57. Preferably, the carrier, or courier, will arrive at the retailer, or seller, to pick up the offered product and apply a shipping label 58. The offered product, or item, will be picked up 59 and delivered 60 to the consumer. The offered product, in the form of a package, will then be received by the consumer via the courier 61.

The system 20 also includes a consumer database storing consumer information, software for choosing the unsold items from the inventory and generating the incentives for the chosen unsold items based on the consumer information in the consumer database, and software for offering the chosen unsold items and the incentives to consumers to induce purchasing of the chosen unsold items. The consumer information has, at the least, information relating to bids on the auction items.

The system 20 also includes a first memory for storing the consumer profiles having consumer information, having at least information relating to bids on the auction items, a second memory for storing the unsold items in the inventory, and a third memory for storing the incentives for each unsold item, each incentive having a value based on a selection of the consumer information. The first memory stores computed historical, current, and projected aggregated consumer information as consumer profiles.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

We claim:

1. A method of providing incentives to bidders on an auction item via a computer network, said method comprising:
   creating a consumer profile via a computer network for at least one consumer, the consumer profile including at least information relating to a bid on the computer network auction item;
   choosing at least one unsold item from an inventory based on the information in the consumer profile;
   generating an incentive for the at least one chosen unsold item using a learning model that calculates the incentive based on the information relating to the bid on the auction item; and
   offering via the computer network the at least one chosen unsold item and the incentive to the at least one consumer to induce purchasing of the chosen unsold item.

2. The method of claim 1 further comprising:
   providing a maximum allowable discount for each unsold item from the inventory, the incentive comprising an amount less than the maximum allowable discount.

3. The method of claim 2 wherein the providing comprises:
   negotiating the maximum allowable discount of the unsold item with a seller.

4. The method of claim 2 wherein the providing comprises:
   establishing a discount zone between a full price of the unsold item and the full price less the maximum allowable discount.

5. The method of claim 4 wherein the generating comprises:
   determining an effective price within the discount zone deemed necessary to trigger a consumer purchase, the discount zone having a consumer surplus between the full price and the effective price and a seller surplus between the effective price and the full price less the maximum allowable discount;
   calculating at least one of a rebate and coupon equivalent to the consumer surplus.

6. The method of claim 5 further comprising:
   recording at least one of detailed descriptions, a list of similar items, and a list of complementary items of the inventory;
   calculating the maximum allowable discount based on the seller's inventory pressure;
   inputting into the consumer profile at least one of bidding history, start bid, bid frequency, bid increment, final bid, winning bid, target product, click stream, Internet service provider, zip code, credit card type, and coupon redemption rate;

comparing the consumer profile to an index of consumer behavior indicators;

categorizing the consumer according to results of the comparison;

assigning a weight to the input of the consumer profile to determine importance of the input; and monitoring the input to improve accuracy of the assigned weights.

7. The method of claim 5 further comprising:

generating revenue by at least one of charging a transaction fee and receiving a percentage of the seller surplus on the unsold item.

8. The method of claim 5 wherein the offering comprises:

basing the incentive on a retail price of the auction item.

9. The method of claim 1 further comprising:

updating the consumer profile by recording whether the incentive was redeemed.

10. The method of claim 1 further comprising:

furnishing at least one bid less than a lowest successful bid for the auction item.

11. The method of claim 1 wherein the generating comprises:

establishing the incentive based on at least one of inventory levels, market conditions, and consumer preferences.

12. The method of claim 1 wherein the choosing comprises:

furnishing at least one of slow-moving inventory, dead inventory, and returned items from at least one seller.

13. The method of claim 1 wherein the offering comprises:

basing an incentive on the unsuccessful bid.

14. The method of claim 1 wherein the creating comprises:

evaluating consumer behavior;

determining demographics and psychographics of the consumer;

gathering transaction information of the consumer; and classifying the consumer in a consumer category.

15. The method of claim 1 wherein the choosing comprises:

selecting a comparable unsold item in relation to the auction item.

16. The method of claim 1 wherein the choosing comprises:

redirecting the consumer to a different unsold item as compared to the auction item.

17. The method of claim 1 wherein the offering comprises:

extending a general incentive with at least one seller.

18. The method of claim 1 wherein the offering comprises:

expiring the incentive upon at least one of a rejection by the consumer and a termination of communications by the consumer.

19. A system for implementing an incentive program for bidders on auction items offered via a computer network comprising:

a consumer database storing consumer information, including at least information relating to bids on the auction items offered via a computer network;

software for choosing unsold items from an inventory and generating incentives for the chosen unsold items using a learning model that calculates the incentive based on the information relating to the bid on the auction item in the consumer database; and software for offering the chosen unsold items and the incentives to consumers to induce purchasing of the chosen unsold items.

20. A method of providing incentives to bidders on an auction item using a system having a first memory for storing consumer profiles having consumer information, including at least information relating to bids on the auction items, a second memory for storing unsold items in an inventory, and a third memory for storing a plurality of incentives for each unsold item, each incentive having a value based on a selection of the consumer information, the method comprising:

creating the consumer profile for at least one consumer and storing the profile on the first electronic memory via a computer network;

choosing at least one of the unsold items from the inventory based on the [consumer information] the information relating to the bid on the auction item in the consumer profile and storing the item on the second electronic memory;

generating the incentive, which is chosen from a number of incentives that are stored on a third memory, for the chosen unsold item using a learning model that calculates the incentive based on the [consumer profile] the information relating to the bid on the auction item, the selection of consumer information of the incentive being substantially similar to the consumer information in the consumer profile; and offering the chosen unsold item and the incentive via a computer network to the at least one consumer to induce purchasing of the chosen unsold item.

* * * * *